July 23, 1929.  C. H. KEENEY  1,721,562
CONTINUOUS COOKER
Filed June 15, 1928
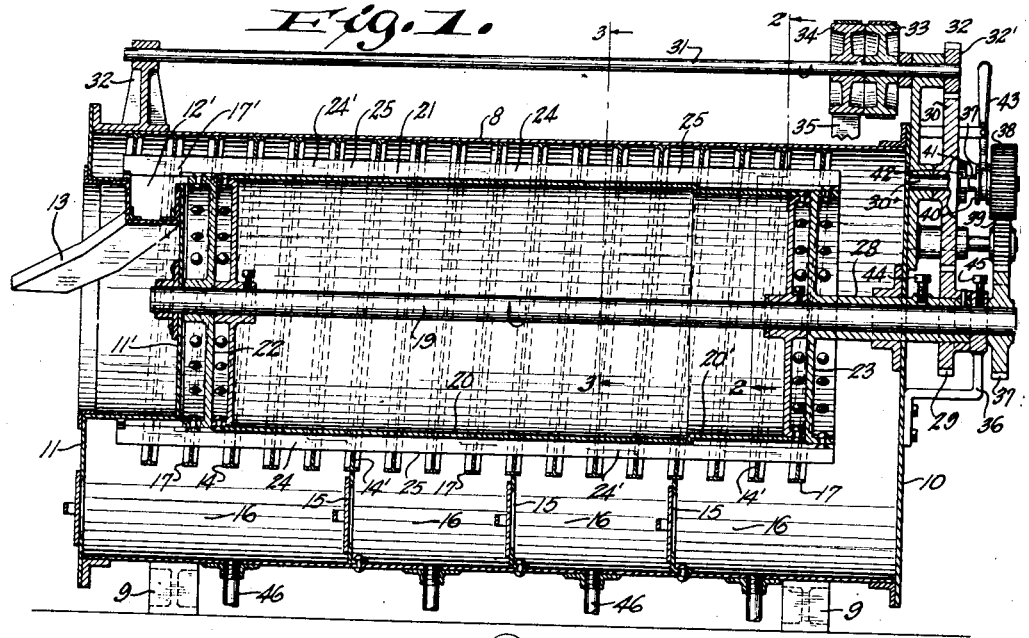
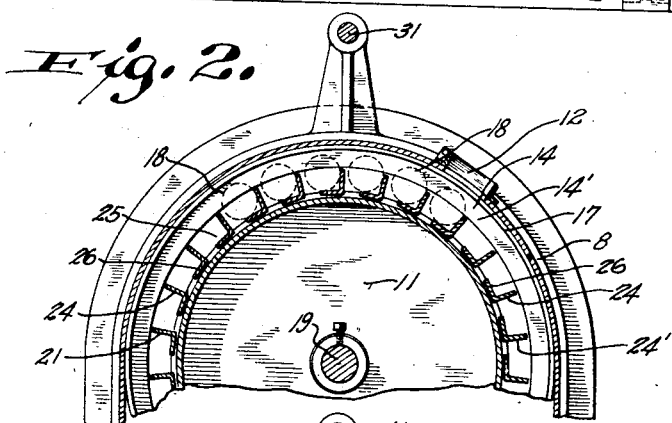
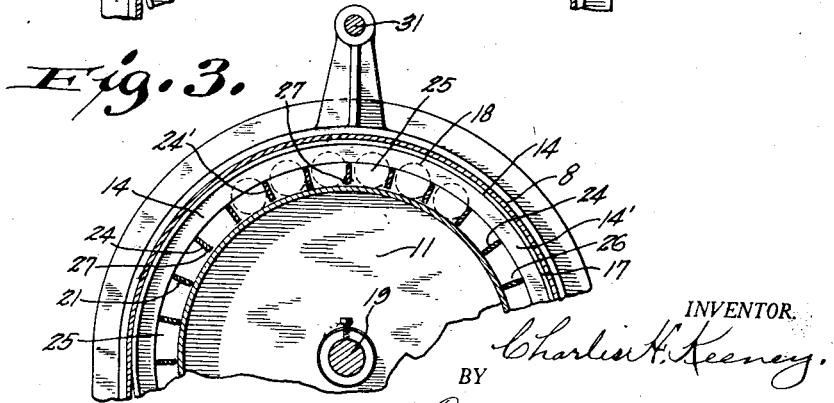
INVENTOR.
Charlie H. Keeney.
BY
Morsell, Keeney & Morsell,
ATTORNEYS.

Patented July 23, 1929.

1,721,562

UNITED STATES PATENT OFFICE.

CHARLES H. KEENEY, OF MILWAUKEE, WISCONSIN, ASSIGNOR TO BERLIN-CHAPMAN COMPANY, OF BERLIN, WISCONSIN, A CORPORATION OF WISCONSIN.

CONTINUOUS COOKER.

Application filed June 15, 1928. Serial No. 285,647.

This invention relates to improvements in continuous cookers, more particularly adapted for the cooking and sterilization of food, commonly known as processing, after the food has been placed in metal cans.

In continuous cookers or sterilizers for cooking food in cans, it is desirable to control the agitation of the food within the cans, as some food requires a greater period of agitation than other foods during the cooking or sterilization process.

It is one of the objects of the present invention to provide a continuous cooker having means for agitating the food within the cans while passing through the cooker in addition to the normal amount of agitation provided during the ordinary passage of the cans.

A further object of the invention is to provide a continuous cooker having an inner spirally trending canway and an inner rotary carrier for moving the cans along the spiral canway in which a portion of the carrier may be rotated independently of the other portion to further agitate the food in the cans.

A further object of the invention is to provide a continuous cooker having variable heating zone partitions and an inner carrier drum for maintaining different temperatures in the different zones in which the can carrier portion of the drum may be independently rotated, if desired, to provide additional agitation of the food within the cans during the cooking process.

A further object of the invention is to provide a continuous cooker in which the carrier drum within the cooker is formed with a portion of larger diameter to permit the cans of food to ride directly upon this portion of the drum and rotate the cans when the drum is held stationary and the carrier portion thereof is rotated.

A further object of the invention is to provide a continuous cooker having a two-part carrier in which provision is made for rotating the two parts as one, rotating the carrier part while the drum part is held in a fixed position, holding the carrier part while the drum is rotated or rotating either part in either direction with or without the other part.

A further object of the invention is to provide a continuous cooker which is of simple construction, is strong and durable and is well adapted for the purpose desired.

With the above and other objects in view, the invention consists of the improved continuous cooker and its parts and combinations as set forth in the claims and all equivalents thereof.

In the accompanying drawing in which the same reference characters indicate the same parts in all of the views:

Fig. 1 is a vertical longitudinal sectional view of the improved continuous cooker;

Fig. 2 is a transverse sectional detail view taken on line 2—2 of Fig. 1; and

Fig. 3 is a similar sectional view taken on line 3—3 of Fig. 1.

Referring to the drawing, the numeral 8 indicates a horizontally extending cylinder or tank cooker which is supported upon legs 9 and closed at its opposite ends by heads 10 and 11. The tank is provided with an inlet opening 12 at one end portion and an outlet opening 12' extending through the recessed end portion 11' of the head 11 at the opposite end of the tank. A discharge canway 13 provides for removing the processed cans from the recessed head 11'.

The tank 8 is somewhat of oval form in cross-section and the upper inner portion supports a spirally trending canway or guide 14, and partitions 15 mounted in the lower portion of the tank extend upwardly to the spiral guide to form compartments or heat zones 16 of varying temperatures. The spirally trending guide is formed of metal of T-shape in cross-section, with the stem portion 14' thereof extending radially inwardly to form end guiding means for the cans. The other flange 17 of the guide extends spirally circumferentially on both sides of the radial flange and forms the supporting means upon which the cans 18 roll. Portions of the adjacent spiral flange are in alinement with the discharging opening 12', as indicated by the numeral 17', to permit the cans being discharged from the tank.

A shaft 19 journaled in the tank heads and extending longitudinally through the central portion of the spiral guide has a closed end drum 20 mounted fast thereon, and said drum is formed with a reduced diameter end portion 20' at the inlet end of the tank. A rotary carrier 21 is formed in part of heads 22 and 23 journaled respectively on the shaft 19 adjacent the opposite ends of the drum 20, and said heads are connected together by parallel angle bars 24 which extend adjacent the peripheral surface of the drum and longitudinally thereof. The outer edges of the radial or stem portions 24' of the bars 24 terminate close to the inner edges of the spiral member 14, and said spiral member and bars coact with one another in forming pockets 25 for receiving cans and in moving cans from one end of the inlet opening of the tank to the discharge opening thereof.

The circumferential flanges 26 of the angle bars 24, which extend along the portion of the drum of less diameter, support the cans of food during the movement of the cans above the drum, whereas the portions of the bars extending along the remaining surface of the drum have the greater portions of their circumferentially extending flanges removed, as indicated by the numeral 27, so that cans in the pockets 25 will ride directly on the upper surface of the drum in passing thereover. If the drum is held in a fixed position and the carrier is turned around the drum, the cans in the pockets will be caused to roll on the drum during the upper portion of their travel, and the contents of the cans will thus be agitated. In rotating the drum at the same speed as the carrier, the cans will be merely carried in the pockets during the upper portion of their travel without any rolling movement, and consequently without agitation.

In the lower portion of the travel of the cans, the said cans will roll on the inner flange 17 of the spiral member and agitate the contents of the cans during their lower path of travel, provided the specific gravity of said contents is greater than the specific gravity of the water within the tank. It will thus be seen that the degree of agitation may be varied by varying the relative speeds of the drum and the carrier.

The head 23 of the carried is formed with a tubular hub portion 28 and said hub portion extends outwardly through the head 10 which forms a bearing therefor, and the outer end of the tubular portion has mounted thereon a pinion 29 which is in mesh with a gear wheel 30 journaled on a stud shaft 30' projecting outwardly from the head 10. A shaft 31 journaled in bearings 32 mounted on the upper portion of the tank extends longitudinally thereof, and is provided at one end with a pinion 32' which is in mesh with the gear 30 and drives the same.

Tight and loose pulleys 33 and 34 mounted and journaled on the shaft 31 are connected to a source of drive by a belt 35.

The outer end portion of the drum shaft 19 extends through the tubular hub extension 28 and is journaled in a bearing bracket 36, and at its outer end is provided with a gear wheel 37. A gear wheel 38 slidably journaled on the outer end portion of the stud shaft 30' forms one of a chain of gears 39 which connects the gear 38 to the gear 37 to give the desired direction of rotation. The gear 38 has a hub portion 40 in the form of a clutch member 41 which is adapted to engage the complementary clutch member 42 forming part of the hub portion of the gear wheel 30. A clutch lever 43 pivotally connected to the bearing member 32 is arranged to slide the gear 38 into and out of clutching engagement with the gear wheel 30. The face of the gear 38 is of sufficient width to engage the pinion of the chain of gears in either position of adjustment of the gear 38. When the gear 38 is in clutched engagement with the gear 30, both the drum 20 and the carrier 21 will be rotated in the same direction and the cans will be carried within the pockets formed by the two members.

By adding more or less gears to the chain of gears 39, the direction of rotation of the drum 20 may be reversed from the direction of rotation of the carrier, and thus materially increase the degree of agitation, and by increasing or diminishing the speed of the parts, relatively varying degrees of agitation may be provided.

The tubular extension hub portion 28 is provided with a set screw 44 to lock the carrier 21 to the shaft 19 when it is desired to rotate both members as one, and the bracket bearing is also provided with a set screw 45 for locking the shaft 19 and the drum 20 against rotation when it is desired to rotate the carrier 21 alone.

It is also to be understood that the carrier and drum may be used on other types of machines in the canning art without departing from the spirit and scope of the invention.

From the foregoing description it will be seen that the continuous cooker is of simple construction and is well adapted for the purpose described.

What I claim is my invention is:

1. A continuous cooker, comprising a tank having a can inlet and an outlet opening, a fixed spiral member within the tank, a rotary drum extending into the spiral member and journaled in the tank, a rotary carrier extending around the drum and within the spiral member and journaled in the tank, said spiral member, rotary drum and rotary carrier forming pockets for receiving, agitating and moving cans from the inlet to the outlet opening of the tank, means for rotating the drum, and means for rotating the carrier independently of the rotation of the drum to vary the agitation of the cans.

2. A continuous cooker, comprising a tank having a can inlet and outlet opening, a fixed spiral member within the tank, a rotary drum extending through the spiral member and journaled in the tank, a rotary carrier extending through the spiral member and journaled in the tank, means for rotating the drum, means for rotating the carrier independently of the rotation of the drum to vary the agitation of the cans carried thereby, and means for locking the carrier and the drum together to rotate synchronously when desired.

3. A continuous cooker, comprising a tank having a can inlet and outlet opening, a fixed spiral member within the tank, a rotary drum extending through the spiral member and journaled in the tank, a rotary carrier extending through the spiral member and journaled in the tank, means for rotating the drum, means for rotating the carrier independently of the rotation of the drum to vary the agitation of the can carried thereby, and means for locking the drum against rotation.

4. A continuous cooker, comprising a tank having a can inlet and outlet opening, a fixed spiral member within the tank, a rotary drum extending through the spiral member and journaled in the tank, a rotary carrier extending through the spiral member and journaled in the tank, means for rotating the drum, means for rotating the carrier independently of the rotation of the drum to vary the agitation of the cans carried thereby, means for locking the drum against rotation, and means for locking the carrier and the drum together to rotate synchronously when desired.

5. A continuous cooker, comprising a tank having a can inlet and outlet opening, a fixed spiral member extending longitudinally of the tank and to said openings, a shaft extending through the spiral member and journaled in the tank and extending through one end portion thereof, a drum within the spiral member and mounted fast on the shaft, a rotary carrier journaled on the shaft and extending between the drum and the spiral member, means for rotating the shaft, and means for rotating the carrier independently of the rotation of the drum to vary the agitation of the cans carried thereby.

6. A continuous cooker, comprising a tank having a can inlet and outlet opening, a fixed spiral member extending longitudinally of the tank and to said openings, a main shaft extending through the spiral member and journaled in the tank and extending through one end portion thereof, a drum within the spiral member and mounted fast on the shaft, a rotary carrier journaled on the shaft and extending between the drum and the spiral member and having a tubular hub portion which projects outwardly through one end of and is journaled in the tank, a driving connection for the outer end portion of the tubular hub, a driving connection for the outer end portion of the shaft, and means controlling the rotation of the shaft.

7. A continuous cooker, comprising a tank having a can inlet and outlet opening, a fixed spiral member extending longitudinally of the tank and to said openings, a main shaft extending through the spiral member and journaled in the tank and extending through one end portion thereof, a drum within the spiral member and mounted fast on the shaft, a rotary carrier journaled on the shaft and extending between the drum and the spiral member and having a tubular hub portion which projects outwardly through one end of and is journaled in the tank, a gear mounted on the outer end portion of the tubular hub, a stud shaft mounted on the tank, a gear journaled on the stud shaft and in mesh with the hub gear, said stud shaft gear having a clutch hub portion, a gear mounted on the outer end portion of the main shaft, a gear journaled on the stud shaft and in mesh with the main shaft gear and having a clutch hub portion engageable with the clutch hub portion of the other gear, means for driving the last mentioned gear, and means for moving one of the gears into clutch engagement with the other gear.

8. A continuous cooker, comprising a tank having a can inlet and outlet opening, a fixed spiral member within the tank, a rotary drum extending through the spiral member and journaled in the tank, said drum having one peripheral portion of less diameter than other portions, a rotary carrier formed of longitudinal members extending through the spiral member and journaled in the tank and having angular portions which are positioned adjacent the portion of the drum of less diameter, means for rotating the drum, and means for rotating the carrier independently of the rotation of the drum to vary the agitation of the cans carried thereby.

9. A continuous cooker, comprising a tank having a can inlet and outlet opening, a fixed spiral member within the tank, a rotary drum extending through the spiral member and journaled in the tank, a rotary carrier extending through the spiral member and journaled in the tank independently of the drum, said spiral member, drum and carrier coacting to move cans of food from the inlet to the outlet opening of the tank and in moving to cause the cans to be supported by the carrier for a portion of their movement and to be supported on the drum for a further portion of the movement of the cans, and means for rotating the carrier and drum.

10. A continuous cooker, comprising a tank having a can inlet and outlet opening, a fixed spiral member within the tank, a rotary drum extending through the spiral member and journaled in the tank, a rotary carrier extending through the spiral member and journaled in the tank, said spiral member, drum and carrier coacting to move cans of food from the inlet to the outlet opening of the tank and in moving to cause the cans to be supported by the carrier for a portion of their movement and to be supported on the drum for the remaining portion of the movement of the cans, and means for rotating the drum and the carrier at different relative speeds and for stopping the rotation of one of the members when desired.

In testimony whereof, I affix my signature.

CHARLES H. KEENEY.